April 12, 1938.  B. J. KLEERUP  2,113,844
SLIDE CARRIER
Filed July 1, 1936
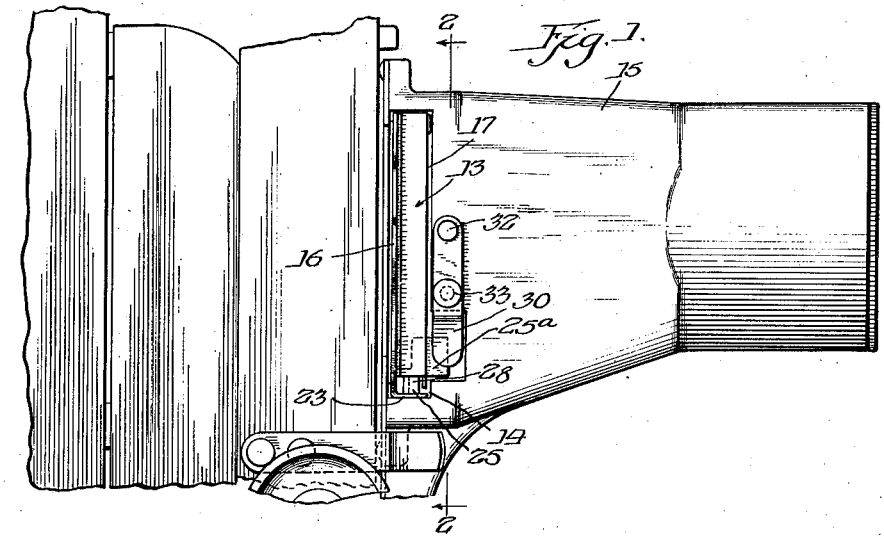
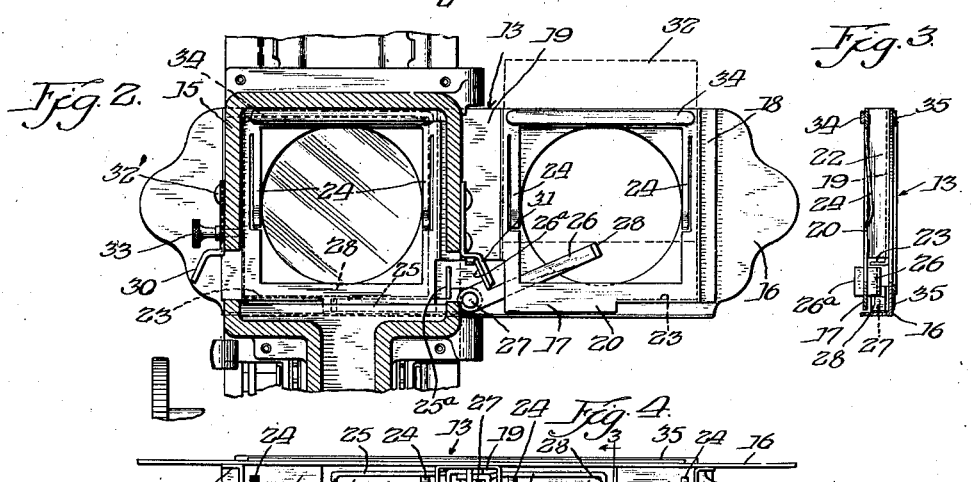
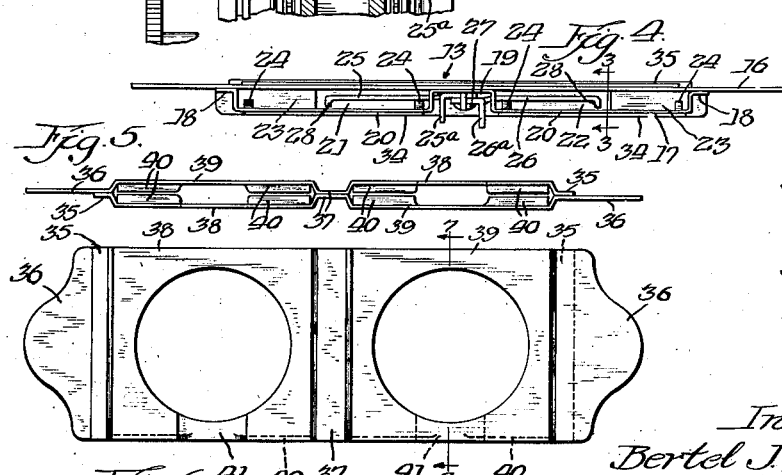
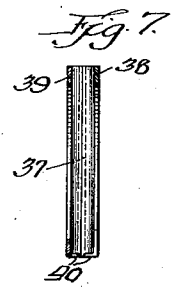
Inventor:
Bertel J. Kleerup
By Paul Carpenter
Atty Patented Apr. 12, 1938

2,113,844

UNITED STATES PATENT OFFICE 2,113,844

SLIDE CARRIER

Bertel J. Kleerup, Chicago, Ill., assignor to Society for Visual Education, Inc., Chicago, Ill., a corporation of Delaware Application July 1, 1936, Serial No. 88,364

4 Claims. (Cl. 88—26)

This invention relates to improvements in projectors, stereopticon machines and the like.

In the use of conventional projectors, stereopticon machines and the like, the operator removes the slides or plates from the holder by grasping them at the upper edges, but in so doing his fingers frequently come into contact with the exposure portions of the plates, thereby leaving finger marks or smudges which impair the quality of the projected picture when the plates are again used, unless in the meantime the plates have been cleaned which may even cause permanent injury or destruction of the slide itself.

One object of the present invention is to provide a plate holder so constructed that the plates can first be raised from the holder a distance enabling the operator to grasp opposite edges thereof without likelihood of touching the surfaces of the plates and smudging the same and thus eliminating the necessity for frequent cleaning of finger marks.

Another object of the invention is to provide mechanism for automatically moving plates partially from a plate holder as the latter is shifted from one position to the other in the usual manner whereby opposite edges of the plates to be removed are conveniently accessible to the operator, and so enabling him to remove the plates without smudging the surfaces thereof.

My invention contemplates such other and further objects as will appear as the description of my invention and apparatus proceeds.

In attaining the foregoing objects together with such further benefits, advantages and capabilities as may hereafter appear and as are inherently possessed by my apparatus, I use the construction shown in a preferred form and an optional form in the accompanying single sheet of drawings.

Referring to the drawing:

Figure 1 is a fragmentary side elevation of a projector having an embodiment of the present improvements incorporated therein.

Figure 2 is a vertical section taken on line 2—2 of Figure 1 looking in the direction of the arrows.

Figure 3 is a sectional view taken on line 3—3 of Figure 4 looking in the direction of the arrows.

Figure 4 is a top plan view of an improved plate holder removed from the machine.

Figure 5 is a top plan view of a plate holder of modified form.

Figure 6 is a front elevation of the holder shown in Figure 5, and

Figure 7 is a transverse section taken on line 7—7 of Figure 6 looking in the direction of the arrows.

In the use of my invention herein disclosed I contemplate its adaptation to any kind of projector, stereopticon machine or the like and the projector shown in fragment in Figures 1 and 2 of the drawing is of a well-known type for the projection of still pictures from continuous film or from slides or plates.

The present improvements relate to holders for the conventional slides or plates to be projected. The holder of my preferred form indicated generally by numeral 13, slides transversely of the machine in the usual manner in a passage 14 provided in the objective lens housing 15. The holder illustrated in Figures 1 to 4 inclusive is of the dual plate type and comprises a back plate 16 and a front plate 17 having co-planar end portions 18 and intermediate portion 19 secured to the plate 16 as by welding, for example. The plate 17 has two portions 20 off-set forwardly from the plane of the portions 18 and 19 and define similar plate receiving chambers 21 and 22. Each of the chambers is provided with a partial bottom 23 formed by an inwardly turned flange which is integral with the plate 17.

The chambers 21, 22 are open at the upper ends for accommodating the insertion of the slides or plates in the usual manner and spring clips 24 are illustrated as being integral with the plate 17 to exert sufficient contact on the forward margins of the plates to retain them in the proper plane within the respective chambers. The pressure of the clips 24 against the inserted plates, however, is not sufficient to prevent the plates from gravitating into the chambers until arrested by the bottoms 23 as later described.

Mechanism is provided for elevating the plates partially from the chambers 21 and 22 as the holder is shifted to move the slides or plates alternately from picture-projection to plate-removing position. The mechanism illustrated comprises a pair of levers indicated generally by numerals 25, 26, which are pivoted at 27 to the holder and each extending into one of the plate chambers and having an arm provided at the free end thereof with a plate engaging member 28. As illustrated in Figures 2 and 4 the members 28 may be formed by bending the ends of the respective levers forwardly.

As illustrated in Figure 4, the levers 25, 26 are disposed in the plane of the respective chambers 21, 22 and when the lever arms are in inoperative position they are disposed beneath the level of the chamber bottoms 23.

Means are provided to effect the pivotal movement of the levers 25, 26 from the inoperative horizontal position, corresponding to the position of arm 25 of Figure 2, to the operative position. corresponding to the full line position of arm 26 of said figure to raise the slide or plate 32 and enable proper removal thereof. The means illustrated comprise members 25a, 26a, carried by the levers 25, 26 respectively, which extend forwardly of the holder 13 for engagement with aligned abutment or stop members 30, 31 respectively, which are secured to the side walls of the housing 15.

As the holder 13 is moved to the position shown in Figure 2, the member 26a will engage the abutment 31 and swing the lever on its pivot 27 to the position illustrated, thus elevating a plate 32 to the dotted line position illustrated. The operator can then conveniently grasp the vertical edges of the plate and remove it and insert another plate in the chamber. The inserted plate will be arrested in its downward movement by the member 28 of the lever 26, but as the holder is shifted to the left, into projection position member 26a is released from engagement with the member 31, and the lever and plate will move downwardly until the latter rests on the bottom 23. During this movement of the holder to the left, the member 25a of lever 25 will engage the stop member 30 which will elevate the plate partially from the chamber 21 in similar manner, thus facilitating the removal by enabling the operator to grasp the vertical edges and avoiding contact of the fingers with the face of the plate.

To provide for the insertion or removal of holder 13 from the passage 14, the stop member 30 is pivotally secured at 32' to the housing 15. A screw 33 is provided to hold the stop in the operative position during use, but which may be removed to permit the stop to be swung to one side to enable the withdrawal of the holder when desired. The other stop member 31 may be riveted in place, as illustrated in Figure 2.

Wear strips or shoes 34 and 35 are shown on the front and rear faces of the holder 13.

The modified form of the holder shown in Figures 5 to 7 inclusive comprises two identical plates which may be stamped from sheet metal or other suitable material and each having co-planar end and intermediate portions 35, 36 and 37, and offset plate-chamber defining portions 38 and 39. The plates are secured together by any suitable means, as by welding the same at their contacting portions. The bottoms of the chambers are formed by flanges 40 directed inwardly of the off-set portions 38, 39 at the lower edges thereof. Each plate is also shown provided with a slot 41 extending from one of the light apertures through the bottom edge of the plate. The flanges 40 form a complete bottom for each compartment except that portions of the bottom in register with the slots 41 are cut away to provide easy access for the operator's fingers. These slots provide recesses for accommodating a finger or thumb of the operator in engaging the bottom edge of the plates to elevate them partially from the holder to a position wherein the plates can be grasped at the vertical edges and removed thus avoiding any touching or handling of the projection portions of the slides or plates. In this modified or optional embodiment the apertures provided enable the operator's fingers to perform the function of levers 25 and 26.

I claim:

1. In a device of the type described comprising a projection machine, a slide carrier movably mounted in said machine, slide elevating levers disposed beneath the lower edges of slides supported in said carrier and pivotally mounted at one end thereof on said carrier, upstanding arms carried by said levers adapted to engage a stop member disposed on said machine in the path of movement of said arms for pivotally moving said levers to raise the slide partially from its carrier as the latter is moved to slide removing position.

2. In a device of the type described comprising a projection machine, a slide holder movably mounted in said machine, said holder comprising two slide carrying compartments, slide elevating levers pivotally carried on said holder beneath the lower edges of slides supported in said compartments, arms fixedly carried by said levers and inclined toward the vertical, and a stop member disposed on said machine in the path of movement of said arms and adapted to engage said arms for pivotally moving said levers to raise a slide partially from its compartment as the latter is moved to slide removing position.

3. In a device of the type described comprising a projection machine, a slide carrier movably mounted in said machine, a slide elevating lever disposed beneath the lower edge of a slide supported in said carrier and pivotally mounted thereon, an arm carried by said lever inclined toward the vertical, and a stop member disposed on said machine in the path of movement of said arm and adapted to engage said arm for pivotally moving said lever to raise said slide partially from its carrier as the latter is moved to slide removing position.

4. In a device of the type described comprising a projection machine, a slide carrier movably mounted in said machine, a slide elevating lever pivotally carried beneath the lower edge of a slide supported in said carrier, an upstanding arm carried by said lever, and a stop member pivotally carried on said machine, normally positioned to bar removal of said carrier from said machine and to pivotally move said lever to raise said slide partially from its carrier as the latter is moved to slide removing position, said stop member being adapted to be pivoted away from its normal position to permit removal of the slide carrier from said machine.

BERTEL J. KLEERUP.